US010915230B1

(12) United States Patent
Leboulleux et al.

(10) Patent No.: US 10,915,230 B1
(45) Date of Patent: Feb. 9, 2021

(54) LAYER SUPERIMPOSITION IN A USER INTERFACE FOR A LIGHTING PLAN

(71) Applicant: CITELUM US, INC., Houston, TX (US)

(72) Inventors: Pierre Leboulleux, Houston, TX (US); Gaelle Malette, Houston, TX (US)

(73) Assignee: CITELUM SA, Paris (FR)

( * ) Notice: Subject to any disclaimer, the term of this patent is extended or adjusted under 35 U.S.C. 154(b) by 0 days.

(21) Appl. No.: 16/743,876

(22) Filed: Jan. 15, 2020

(51) Int. Cl.
*G06F 3/0484* (2013.01)
*G06F 9/451* (2018.01)
*G09G 5/02* (2006.01)

(52) U.S. Cl.
CPC .......... *G06F 3/0484* (2013.01); *G06F 9/451* (2018.02); *G09G 5/026* (2013.01); *G06T 2200/24* (2013.01); *G09G 2340/12* (2013.01)

(58) Field of Classification Search
CPC ...... G06Q 10/06; G06Q 10/10; G06F 3/0484; G06F 9/451; G06F 3/04812; G06F 3/0488; G09G 5/26; G09G 2340/12; G06T 2200/24; H05B 37/02; H05B 29/08
See application file for complete search history.

(56) References Cited

U.S. PATENT DOCUMENTS

| | | | | |
|---|---|---|---|---|
| 8,032,296 B2* | 10/2011 | Bucchieri | .......... | G01C 21/3679 701/423 |
| 8,898,003 B1* | 11/2014 | Pu | .......... | G01C 21/26 701/408 |
| 2003/0080958 A1* | 5/2003 | Matsumoto | .......... | G06T 15/405 345/421 |
| 2009/0243517 A1* | 10/2009 | Verfuerth | .......... | H05B 47/16 315/315 |
| 2010/0188088 A1* | 7/2010 | Nielsen | .......... | G01S 19/13 324/329 |
| 2010/0189312 A1* | 7/2010 | Nielsen | .......... | G09G 5/377 382/113 |
| 2013/0187552 A1* | 7/2013 | Frodsham | .......... | H02J 7/35 315/152 |
| 2013/0311143 A1* | 11/2013 | Striegel | .......... | G06F 30/20 703/1 |
| 2014/0028200 A1* | 1/2014 | Van Wagoner | .......... | H05B 47/10 315/158 |
| 2016/0262241 A1* | 9/2016 | Huang | .......... | H05B 47/19 |
| 2018/0098201 A1* | 4/2018 | Torello | .......... | H02J 13/0062 |
| 2019/0180205 A1* | 6/2019 | Rue | .......... | G06Q 10/0631 |
| 2020/0057828 A1* | 2/2020 | Harrison | .......... | G06N 5/04 |

* cited by examiner

*Primary Examiner* — Steven P Sax
(74) *Attorney, Agent, or Firm* — Clayton, McKay & Bailey, PC (57) ABSTRACT

Examples herein describe systems and methods for light placement in a graphical user interface ("GUI"). A computing device may generate multiple layers that can be superimposed on a base layer in an GUI environment. The layers can include a map layer, an object layer, and a lighting plan layer. The computing device can provide instructions to a client device for displaying the layers, as well as instructions for providing a menu where are user can select which layers are displayed. The lighting plan layer may illustrate a lighting plan for a geographic area, such as a city. The lighting plan layer may include placements of lighting objects in the geographic area based on a set of rules, and it may be dependent on the object layer.

14 Claims, 8 Drawing Sheets

LAYER SUPERIMPOSITION IN A USER INTERFACE FOR A LIGHTING PLAN

BACKGROUND

Urban planning is the process by which land use in and around cities is determined. This can include infrastructure design and development, such as transportation, communications, water management, lighting, etc. As cities grow and time passes, current infrastructure can become insufficient or outdated. For example, a sewage system designed for a certain number of people in a city may be insufficient if the population of the city doubles. Changes must then be made to update the infrastructure for the safety and well-being of residents and guests.

Planning and updating city infrastructure can be a difficult and lengthy process, particularly regarding lighting. Cities can have tens of thousands of lights, and each street or block may have its own unique lighting needs. Additionally, lighting today is available in a large variety of types, varying in brightness, color temperature, wattage, direction, etc. This can make planning lighting in a city extremely complex, and it can be nearly impossible to manually assess and plan for appropriate lighting updates and changes.

Existing software does not include means for accurately planning lighting and other infrastructure needs in an urban environment. Although satellite imagery is available, current solutions do not visualize the finer details or correlations between lighting, infrastructure, and living conditions.

As a result, a need exists for a system that can help resolve lighting issues in cities, including determining where lighting changes and additions are needed.

SUMMARY

Examples described herein include systems and methods for light placement in a graphical user interface ("GUI"). The systems and methods presented herein relate to generating multiple layers and providing an option to present the layers superimposed on each other in the GUI. The GUI can utilize lighting parameters to generate and present a lighting plan.

In an example, a method can include generating multiple layers for display in a GUI. The layers can include, for example, a map layer, an object layer, an information layer and a lighting plan layer. An example map layer can be a map of a geographic area, such as a city. An object layer can include representations of 3D objects. Different objects can be grouped together in object layers or be included in their own object layer. Some example objects that may be found in an object layer include buildings, trees, and streetlights. An information layer can include information related to the geographic area, such as road accident locations, hospital zones, public transportation routes, etc.

The lighting plan layer can include lighting objects placed in the map of the geographic area. The lighting objects can represent varying light types. Light types can vary in qualities such as intensity, wattage, color temperature, pattern, color rendering index ("CRI"), etc. The placement of lighting objects can be based on a set of rules. Some example rules can include placing warm temperature lights in tourist areas, placing more lights in high pedestrian areas, placing additional lights where streets have an unlit segment between lit segments, and placing additional lights in high crime areas. The rules can be created on the GUI and selected for a planning project, in an example.

Lighting object placement can also depend on the object layer. In an example, the rules described above dictate that a type of lighting is needed at a certain location in the geographical area, such as an intersection. In some locations light from the lighting object would be obstructed by objects in the object layer, such as a tree or building. The lighting object is placed so that objects from the object layer do not obstruct the light from reaching its desired location. The objects from the object layer can be based on sensor data that is received in a sensor bar from physically driving around the city. The sensor bar can be mounted to a car, for example.

The method can include providing an option to superimpose any combination of available the layers on each other. In one example, the GUI can provide one layer as a base layer on which other layers are superimposed. For example, the map layer can be displayed in the GUI as the base layer. If a user selects the object layer, then the object layer is superimposed on the map layer, and if a user selects the lighting plan layer, then the light plan layer is superimposed on the map layer. Alternatively, if a user selects both the object layer and the lighting plan layer, then both layers would be superimposed on the map layer simultaneously. The GUI may also allow a user to create new layers as needed.

In another example, the method can include generating a current lighting layer. The current lighting layer can include light objects placed to represent current lighting placements in the geographic area. For example, if a streetlight exists on the corner of two streets in a city, the current lighting layer can include a light object representing the streetlight on the same place in the map layer. In an example, the locations of current lighting are determined using a sensor mounted to a vehicle that is driven around the geographic area. The lighting locations are stored in a database for use in generating the current lighting layer.

The method can include providing a divider option in the GUI. The divider can divide the layers into two regions. One region can include a first layer and the other region can include a second layer. For example, the lighting plan layer and current lighting layer can be superimposed on the map layer. A user selects to activate the divider in the GUI. The divider appears in the interface with the lighting plan layer superimposed on the map layer in one region and the current lighting layer superimposed on the map layer in the other region. In an example, the GUI can provide the user with multiple options to choose which layers are displayed on either side of the divider, which layers are displayed in the interface but are unaffected by the divider, and which layers are not displayed in the interface. In an example, the divider can include a slider. The slider can move the divider within the display, which causes the relative sizes of the first and second region to change.

The method can include providing a lighting heat map layer. The lighting heat map layer can indicate the brightness of existing lighting throughout the geographic area. The highlighted portions can vary in color corresponding to the brightness of the light. A heat map relating to the current lighting layer can help show where new light is needed. In one example, the lighting heat map layer is a feature included in the current lighting layer and the lighting plan layer.

The method can include providing a lighting change recommendation layer. The lighting change recommendation layer can indicate portions of the geographic area where changes to existing lighting are recommended. For example, a lighting change recommendation layer can show areas where the type of lighting should be changed. In another example, a lighting change recommendation layer can show areas where the temperature color of existing lighting should be changed. The GUI include other types of lighting change recommendation layers based on the needs of the geographic area.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Examples herein describe systems and methods for light placement in a graphical user interface ("GUI"). A computing device may generate multiple layers that can be superimposed on a base layer in an GUI environment. The layers can include a map layer, an object layer, and a lighting plan layer. The computing device can provide instructions to a client device for displaying the layers, as well as instructions for providing a menu where are user can select which layers are displayed. The lighting plan layer may illustrate a lighting plan for a geographic area, such as a city. The lighting plan layer may include placements of lighting objects in the geographic area based on a set of rules, and it may be dependent on the object layer.

Figure 1A:
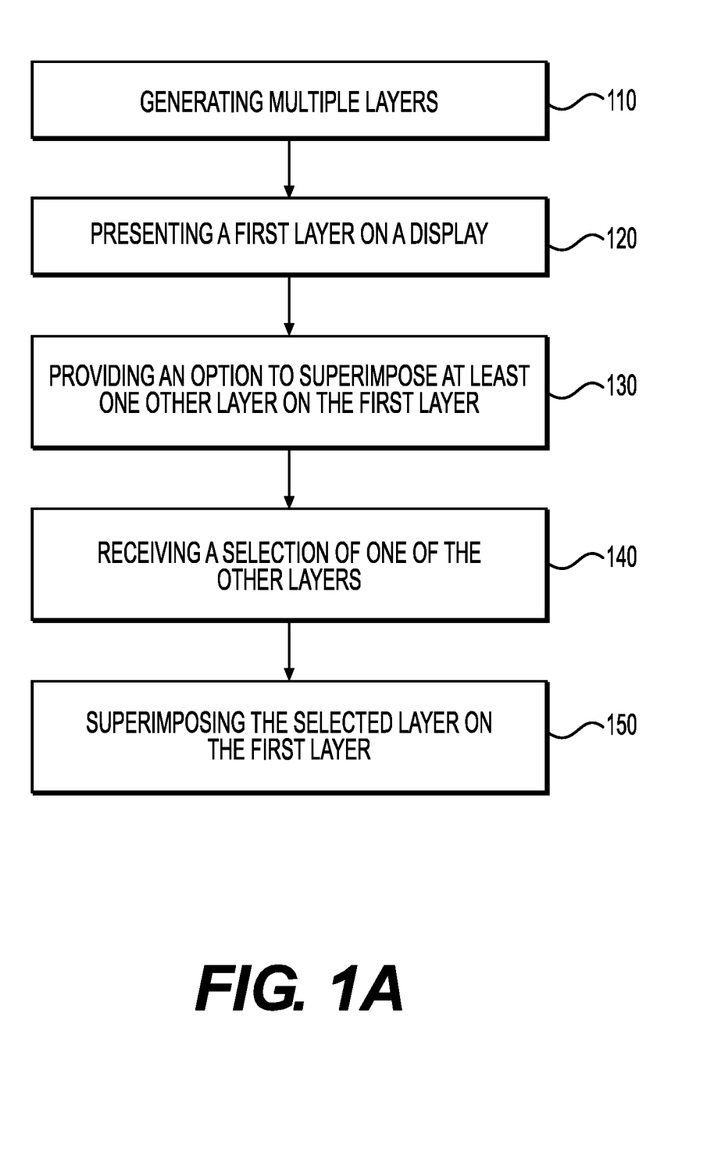
FIG. 1A is a flowchart of an example method for superimposing layers in a graphical user interface ("GUI") for a lighting plan.

FIG. 1A is flowchart of an example method for light placement in a GUI. Although references are made herein to lighting plans and other lighting-related things, those references are merely used as examples and are not intended to be limiting in any way. For example, a reference to "lighting plan layer" can encompass any type of plan layer, even if not related to lighting in any way.

At stage 110, a computing device may create multiple layers for display in a GUI. The GUI can generate multiple types of layers. One example layer type can be image-based similar to a digital imaging layer. Portions of a layer may contain image data while other portions may be blank. For example, the GUI may include a map layer that is type of image layer that includes image data representing streets, walkways, and bodies of water in a geographic area. Portions of the geographic area without streets, walkways, or bodies of water may contain no image data on the map layer.

The GUI may also include an object layer. An object layer can include representations of 3D objects, such as buildings, trees, street signs, public transportation stations, etc. Locations of the objects can correspond to locations of such objects in the geographic area. In one example, information about the 3D objects can be collected by using a sensor bar that is driven around the city or area where the lighting and smart planning will be taking place, as will be explained below. Using environmental data collected from the sensor bar, the objects can be accurately dimensioned and placed more precisely than through merely using photo and global positioning satellite ("GPS") data. In another example, the object layer can include objects that are imported from another system. For example, a city model with object layer data can be provided.

The sensor bar can include multiple different sensors that work together to collect object data. The sensor bar can be affixed to the top of a vehicle in an example, and physically driven down the roads where the city planning is taking place. The object data can be used by a processor to construct accurate dimensional representations of the 3D objects and place the objects with precision relative to the roads traveled with the sensor bar. This precision can allow for meaningful placement and selection of lights, cameras, and sensors within a lighting plan layer. As will be described, lights and other infrastructure can be placed in accordance with their interplay with the objects of the object layer. These lights can then be shown in the lighting plan layer, which can be interlaid on the GUI with the object layer.

The sensor bar can include a stereoscopic camera to locate objects based on depth in relation to the sensor bar. The sensor bar can also include photo sensors for collecting imagery and color sensors for detecting existing light colors. For example, a spectrometer can capture a spectrum of light around the vehicle. The sensor bar can also include temperature sensors to capture the temperature, allowing for correction to what the photo and color sensors have absorbed. For example, the ambient light colors can be warmer in hot weather than in cold weather.

The sensor bar can also include a barometric pressure sensor. The barometric pressure sensor can determine altitude and detect altitude shift. This can allow for correction of object dimensions. For example, GPS data collected with the sensor information can be corrected based on the altitude shift. The barometric pressure sensor can detect less than six inches of altitude shift, in an example. This can also allow for processing to adjust object heights from the GPS and photo data based on the altitude changes. Other environmental data, such as humidity can also be collected.

An object can be determined based on processing the object data received from the sensor bar.

The GUI may include an information layer that includes geographic information such as historic or school districts, public transportation routes, hospital zones, high crime areas, traffic information, political districts, etc. Such information layers can be presented in any easy-to-understand format according to the object type. For example, a public transportation route can be presented as a solid colored line that follows the route, whereas a hospital zone can be presented as a shaded region.

The GUI may include a current lighting layer that shows existing locations of lights in the geographic area. In an example, the current light locations can be represented by lighting objects, such as lighting objects 332 and 334 shown in FIG. 3 discussed below. The lighting objects can vary in size based on the brightness of the light. One method of obtaining light locations can be using the sensor bar previously discussed.

The GUI may include a lighting plan layer, which can be a layer type that shows lighting improvements in the geographic area. The lighting improvements can include, for example, locations of additional lighting and changes to existing lighting. The lighting improvements can be based on a set of rules. Some example rules may include placing warm temperature lights in tourist areas, placing more lights in high pedestrian areas, placing additional lights where streets have an unlit segment between lit segments, placing additional lights in high crime areas, and placing less bright lights in hospital zones. The lighting improvements may also depend on the object layers. For example, buildings and street objects can obstruct the beam coming originating from a light. Lighting improvements can take such obstructions into account in determining where and what types of lighting should be placed.

The lighting plan layer can be one of multiple planning layers that can be overlaid onto the GUI. Other planning layers can include additional infrastructure, such as cameras sensors, and wireless network elements. For example, cameras and sensors can be placed according to object locations and elevations to ensure license plate visibility in areas where the information layer indicates high incidents of crime or traffic violations.

At stage 120, the computing device may provide instructions for displaying a first layer on a display. As an example, the computing device may provide the instructions to a client device that includes a display. The client device may receive the instructions and display the first layer on the display. In an example, the first layer is a base layer on which the other layers are based.

At stage 130, the computing device may provide an option to superimpose at least one other layer on the base layer. For example, an option can be a menu that includes a list of additional layers that can be superimposed on the base layer. The layers in the list can be selectable, and selection of a layer can cause the computing device to superimpose the selected layer on the base layer. In an example, the first layer is a map base layer and the computing device provides an option to superimpose an object layer or a lighting plan layer on the map layer. In this example, the object locations in the object and lighting plan layers are based on the map layer.

At stage 140, the computing device can receive a selection of one or more of the other layers. A selection can be input received from a user, such as a tap, a click, or a double-click. For example, a user interacting with the GUI can select a layer from the menu previously described.

At stage 150, the computing device may provide instructions for superimposing the selected layer(s) on the base layer. Superimposing one layer on another can mean displaying one layer on top of another layer in such a way that both layers are still evident. The instructions may be provided in response to receiving the layer selection.

In an example, a computing device generates multiple layers to be used in a GUI. The multiple layers include a map layer, an object layer, and a lighting plan layer. The computing device provides instructions to a client device to display the map layer on a display. The computing device also provides instructions for presenting a menu in the GUI that includes the object layer and the lighting plan layer. The object layer includes a 3D rendering of buildings located in the geographic area represented by the map layer. A user interacting with the GUI selects the object layer. The computing device receives the selection and sends instructions to the client device to display the object layer superimposed on the map layer. The user then selects the lighting plan layer. The computing device receives the selection and sends instructions to the client device to display the lighting plan layer and the object layer superimposed on the map layer. In another example, the user deselects the object layer, resulting in the computing device sending instructions to the client device to remove the object layer such that the lighting plan layer remains as the only layer superimposed on the map layer.

Figure 1B:
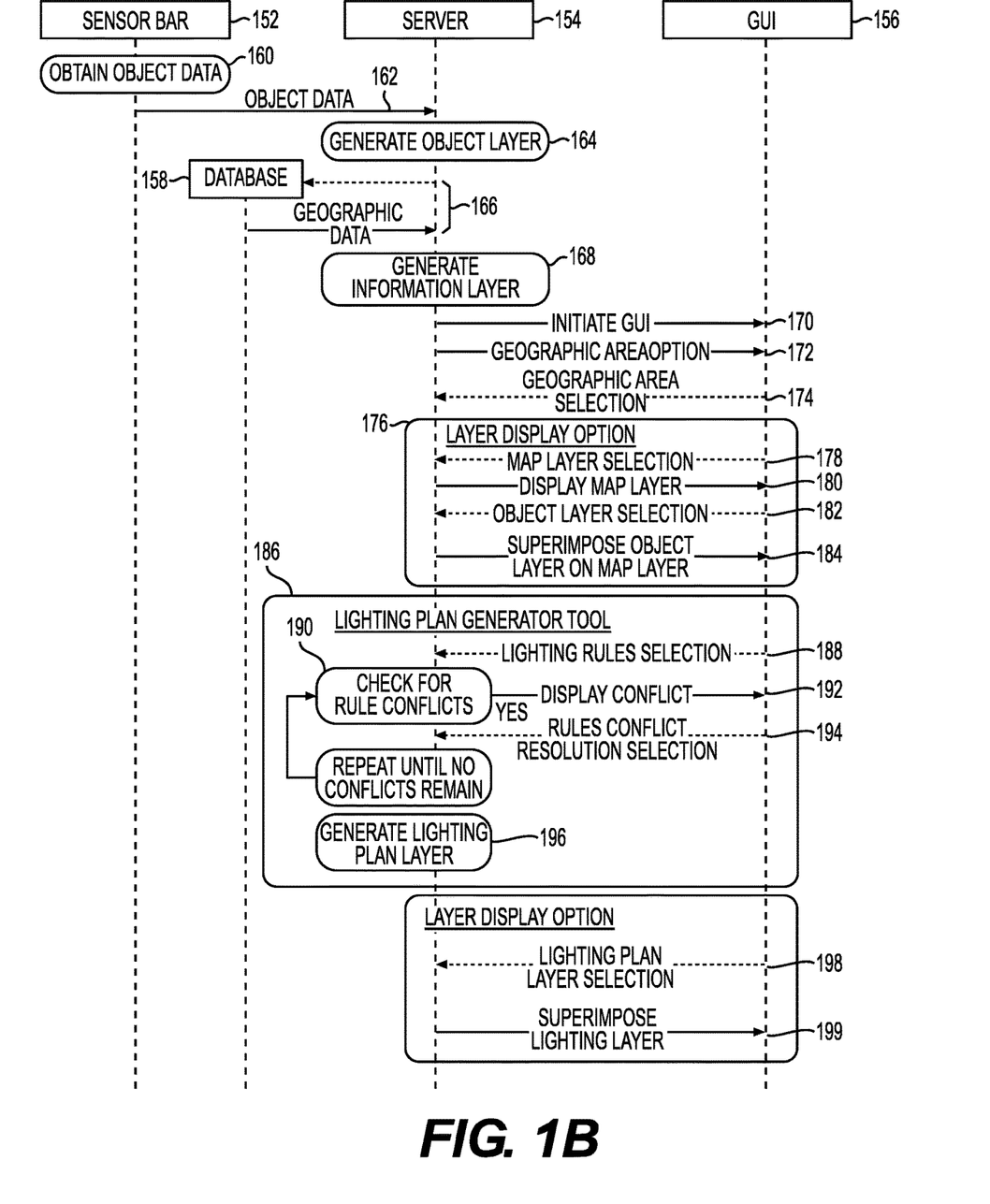
FIG. 1B is a sequence diagram of example stages for displaying a lighting plan.

FIG. 1B is an example sequence diagram for displaying a lighting plan in a GUI in relation to an object layer and an information layer. At stage 160, sensor bar 152 may obtain object data. Object data can be data related to 3D objects found in a geographic area, such as buildings, trees, street signs, public transportation stations, etc. The object data can include information such as the size and shape of the objects as well as geographic information system (GIS) information indicating the exact location of the objects. Sensor bar 152 may obtain object data using methods previously described herein. At stage 162, server 154 may receive the object data from sensor bar 152.

At stage 164, server 154 may generate an object layer using the object data. Generating an object layer may include using the object data to identify objects and their locations. Server 154 may also generate 3D renderings of the objects and place them in the object layer using their GIS locations. In some examples, server 154 may generate multiple object layers. For example, server 154 may generate separate object layers for buildings, trees, streetlights, etc.

At stage 166, server 154 may retrieve geographic information from database 158. Geographic information may include non-object information relating to the geographic area. Some examples of geographic information can include public transportation routes, categorical zones (hospital zones, school zones, tourist areas, etc.), crime data, traffic data, etc. At stage 168, server 154 may generate information layers using on the geographic information.

At stage 170, server 154 may initiate GUI 156. Initiate can mean to cause GUI 156 to be displayed on a device, such as a computer or mobile device. Server 154 may initiate GUI 156 in response to a request by the device. In an example, GUI 156 may be a web-based application. A user interacting with the device may send a request to initiate GUI 156 by navigating to a URL address associated with the GUI application. Server 154 may cause GUI 156 to be displayed in the web browser of the device.

At stage 172, server 154 may provide an option to select a geographic area in GUI 156. The option to select a geographic area may include a menu or search field that allows a user to find a select a geographic area. For example, server 154 may cause a drop-down menu to appear in the GUI from which a user can select a city for which object layers have been created. At stage 174, server 154 may receive a response from GUI 156. The response may include a selection of a geographic area.

At stage 176, server 154 may initiate a layer display option in GUI 156. The layer display option may include a window or menu that includes layers available to be displayed in the GUI. The layers may include, for example, a map layer that includes a map of the geographic area, geographic layers, and object layers.

At stage 178, server 154 may receive a request from GUI 156 to display a map layer. GUI 156 may send the request to server 154 in response to a selection of the map layer made by a user interacting with the GUI. In response to the request, at stage 180 server 154 may cause the map layer to be displayed in GUI 156.

At stage 182, server 154 may receive a request from GUI 156 to display an object layer. GUI 156 may send the request to server 154 in response to a selection of the object layer made by a user interacting with the GUI. In response to the request, at stage 184 server 154 may cause the selected object layer to be displayed in GUI 156. The selected object layer may be superimposed on the map layer such that both layers are evident in the display.

At stage 186, server 154 may initiate a lighting plan generator tool in GUI 156. The lighting plan generator tool may be a software tool that generates a lighting plan for the geographic area. The lighting plan generator tool may include selectable rules that a user may include in generating a lighting plan. The rules can include options for defining specific properties of lighting in certain parts of the geographic area. For example, one rule may require warm temperature lights and low brightness in hospital zones. Another example rule may require cool temperature lights and high brightness in tourist areas. An example rule may also require additional lighting be provided in high crime areas with low lighting.

At stage 188, server 154 may receive a selection of rules from GUI 156. In response to receive the section of rules, at stage 190 server 154 may check for rules conflicts. A rules conflict may be any combination of rules that conflict with each other in the geographic area. Continuing the example from stage 186 above, a tourist area and hospital zone may overlap in the geographic area. The rules for tourist areas and hospital zones are mutually exclusive regarding brightness and light color, so a conflict exists.

If a rules conflict exists, at stage 192 server 154 may display the rules conflicts in GUI 156 as well as options to resolve the conflicts. For example, server 154 may display a menu in GUI 156 where a user can choose to execute the tourist area rule, the hospital zone rule, or to resolve the rules conflict in some other way, such as creating a new rule for such conflicts. The rules conflict notification may also include an option to execute the selected choice in all remaining conflicts of the same combination of rules. At stage 194 server 154 may receive a conflict resolution selection. Server 154 may continue to provide rules conflict notifications in GUI 156 until all rule conflicts are resolved.

Once all conflicts are resolved, at stage 196 server 154 may generate a lighting plan layer for the geographic area. In an example, server 154 may generate the lighting plan layer based on the selected rules from stage 188. Other examples can include selecting lighting patterns, temperatures, or brightness (lumens) based on the area type for that location of the lighting plan. For example, a rule can specify that a downtown area have warm lights. A school zone can have directional lights that do not point towards the school. A high crime area can specify cool light colors and high brightness. The lighting plan layer may also depend on the object layers. For example, objects such as buildings and trees can obstruct light and may prevent a lighting plan from providing the desired lighting. Additionally, directional light patterns can be selected so that bright lights are not directly shining into building windows. To prevent this, server 154 may use the object layers and information layers to determine where lights can be placed to minimize obstruction from objects and achieve the desired lighting. In addition to a lighting plan layer, GUI 156 may also include an option to generate additional plan layers, such as a plan layers for cameras, license plate readers, WIFI and other smart city that may help a city manage its resources more efficiently.

In one example, the conflict can be displayed in the lighting plan layer by highlighting a region where the rules specify conflicting lighting properties for the same area. For example, a tourist area can overlap with a high crime area, with each area being assigned different light temperatures or brightness. The GUI can highlight the overlapping portion, and the user can click that highlighted portion. Then the user can be presented with the conflicting rules and choose one. In one example, the user can rank the rules such that conflicts are automatically resolved. The GUI can still indicate the conflict but display colors and lights indicative of the higher ranked rule.

Once the lighting plan layer is generated, the lighting plan layer may be added to the layer display option from stage 176. At stage 198, server 154 may receive a request from GUI 156 to display the lighting plan layer. GUI 156 may send the request to server 154 in response to a selection of the lighting plan layer made by a user interacting with the GUI. In response to the request, at stage 199 server 154 may cause the lighting plan layer to be displayed in GUI 156. The lighting plan layer may be superimposed on the map layer such that map layer, the lighting plan layer, and any additional selected layers are all evident in the display.

Figure 2:
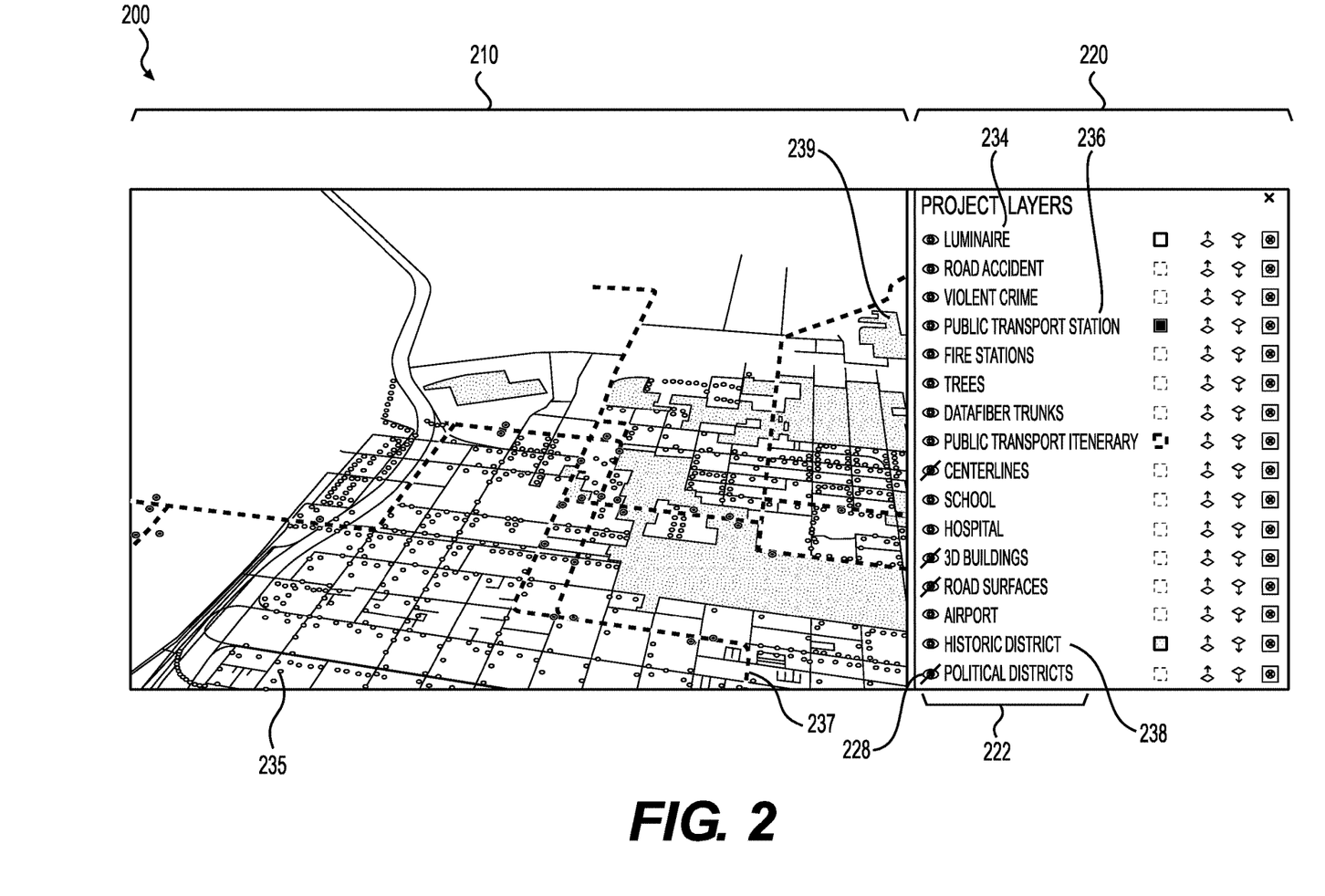
FIG. 2 is an illustration of an example GUI with superimposed layers.

FIG. 2 shows another example GUI screen 200 with multiple superimposed layers. GUI screen 200 can be a part of the configuration described for stages 110-150 of FIG. 1. In this example, GUI screen 200 includes display area 210 and menu 220. Menu 220 includes a list of selectable elements 222 that represent object layers that can be superimposed in display area 210. Menu 220 can also include visibility indicator 228 that indicate whether a layer is currently visible in display area 210. Selecting an element 222 can toggle the visibility of the layer in display area 210.

GUI screen 200 includes a map layer 232 as a first base layer in display area 210. Three of the layers superimposed on map layer 232 are current lighting layer 234, public transportation layer 236, and hospital district layer 238. Current lighting layer 234 includes lighting objects 235 displayed as dots representing locations of lighting objects in the geographic area represented by map layer 232. Public transportation layer 236 includes route objects 237 displayed as lines representing the routes public transportation vehicles follow. Hospital district layer 238 includes regions 239 displayed as shaded areas representing areas of the geographic area that are in a hospital district. As can be seen in FIG. 2, the selected layers are evident while being displayed in the same area.

Figure 3:
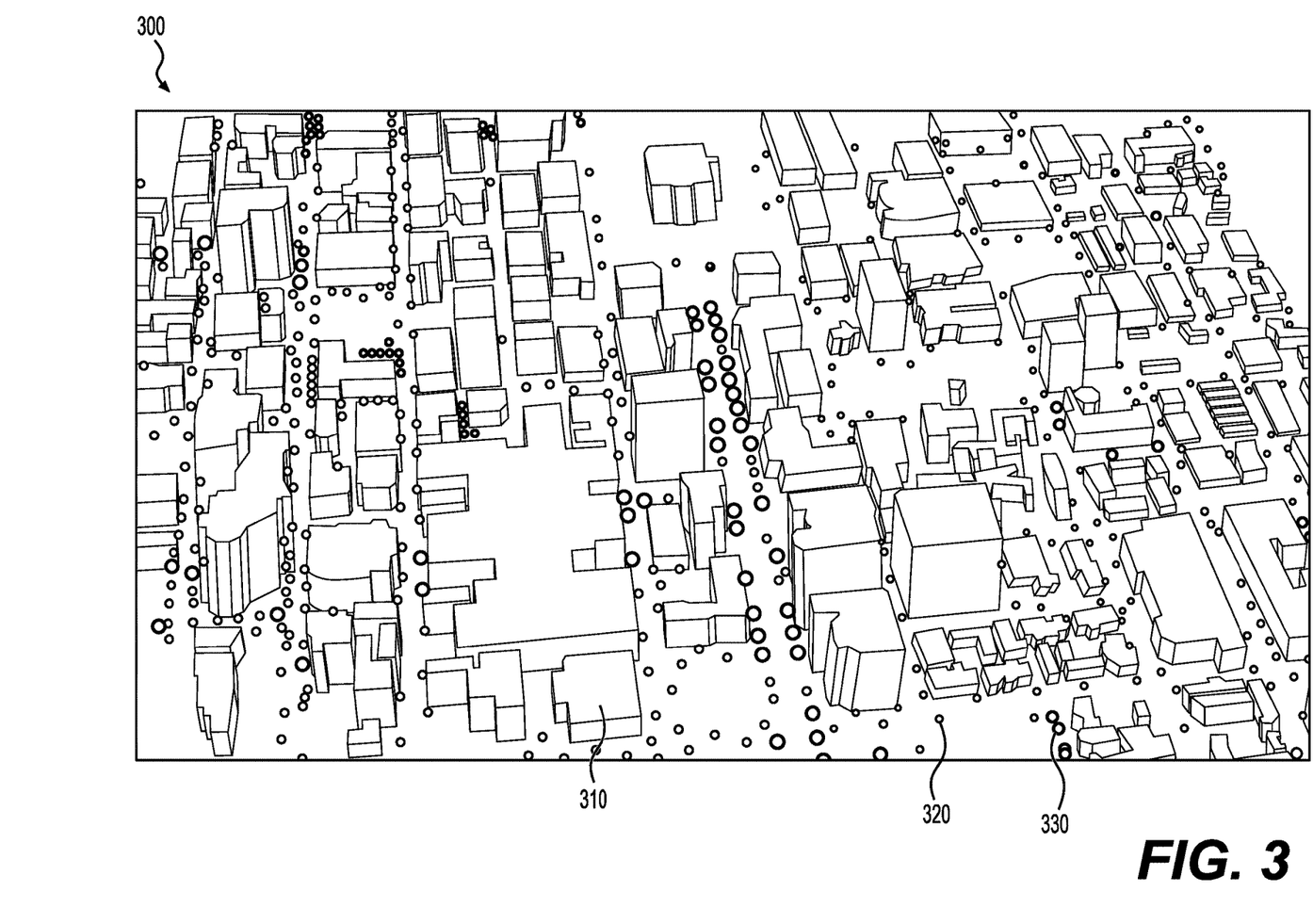
FIG. 3 is an illustration of an example GUI with a layer menu.

FIG. 3 shows an example GUI screen 300 with multiple superimposed layers. GUI screen 300 can be a part of the configuration described for stage 150 of FIG. 1. In this example, an object layer and a lighting plan layer are superimposed on a map layer. The object layer includes building objects like building object 310 that represent buildings located within the geographic area. The lighting plan layer includes lighting objects 320 and 330 that are part of a lighting plan for the geographic region. Lighting objects 330 are larger than lighting objects 320, which can indicate that brighter lights should be placed at lighting object 330 locations as part of a lighting plan. Similar to FIG. 2, selecting the object layer in a menu (not shown) may toggle whether the building objects 310 are displayed. Also, selecting the lighting plan layer in the menu may toggle whether lighting objects 320 and 330 are displayed.

Figure 4:
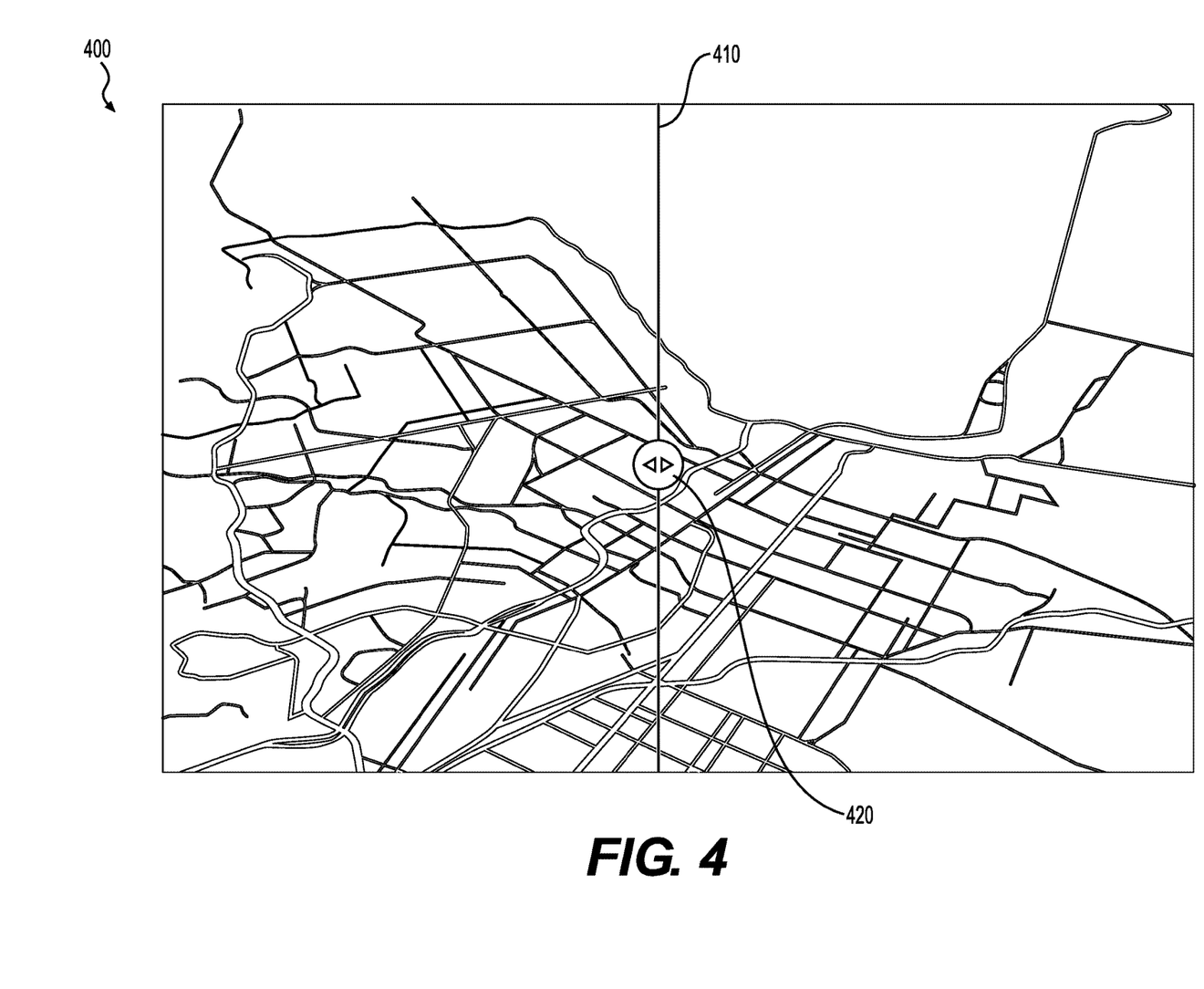
FIG. 4 is an illustration of an example GUI with a divider.

FIG. 4 shows another example GUI screen 400 that includes a divider 410. Divider 410 can act as a boundary where layers can be superimposed on a base layer on one side of divider 410, but not the other. In an example, a user can select one or more layers to be superimposed on one side of divider 410 and one or more layers to be superimposed on the other side of divider 410. In another example, a user can also select one or more layers to be superimposed on the base layer without being affected by divider 410. Divider 410 can also include a slider 420. Slider can allow a user to select divider 410 and drag it across the display area. As divider 410 moves, the relative sizes of the areas on either side of the divider change.

In an example, the base layer of GUI screen 400 is a map layer and divider 410 is vertically orientated. A user interacting with the user interface selects a map layer as the base layer and a building object layer to be superimposed on the base layer in the display area. The user also selects a current lighting layer to be superimposed on the map layer on the left side of divider 410 and a lighting plan layer to be superimposed on the right side. The user can select and hold slider 420 and drag divider 410 across the display area, which causes areas on the left and right side of divider 410 to change. The dragging motion causes the areas that display the current lighting layer and the lighting plan layer to change, but the map layer and building object layer remain unchanged. This may allow the user to quickly view the differences between the current lighting and a proposed lighting plan in the geographic area.

Figure 5:
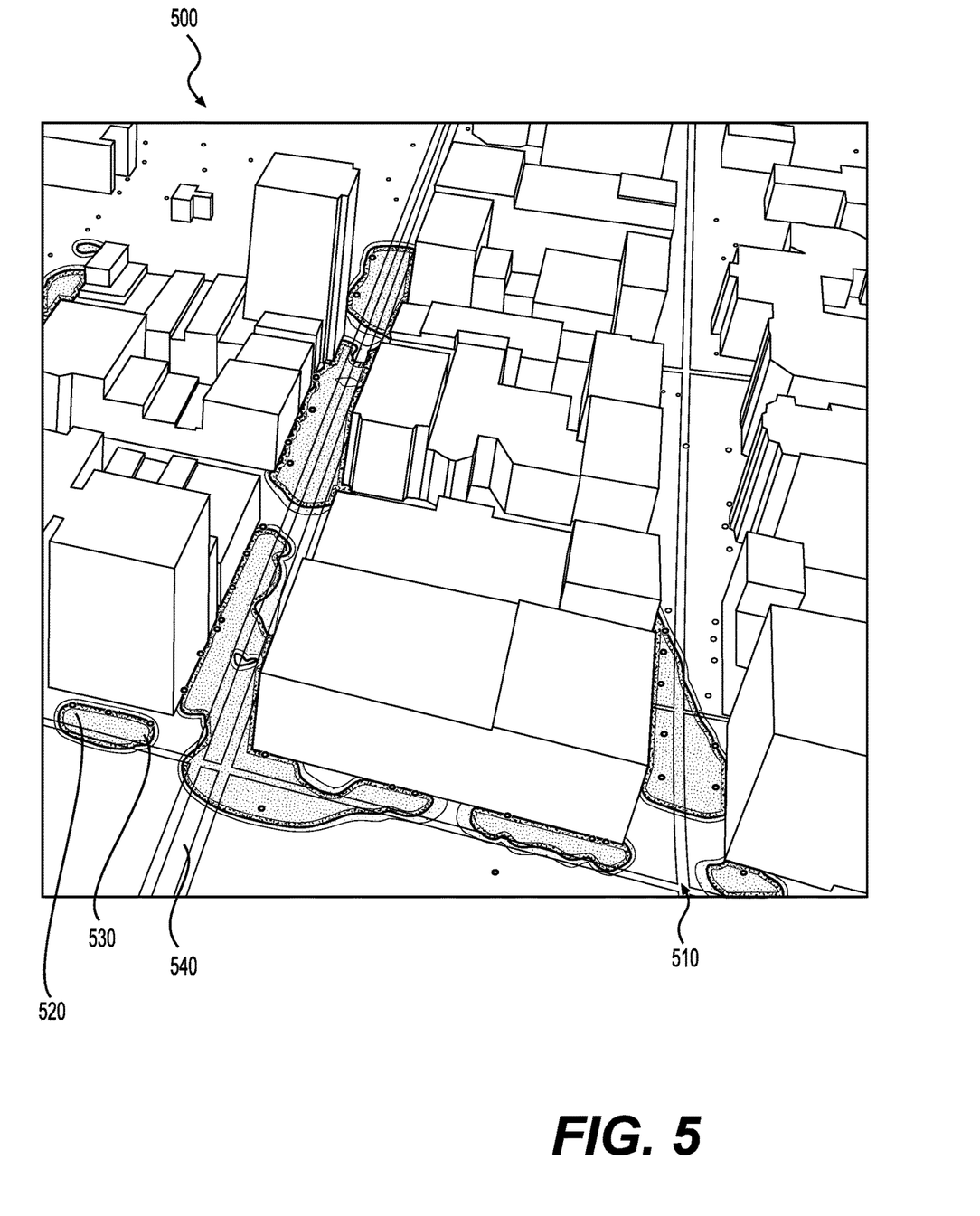
FIG. 5 is an illustration of an example GUI with a heat map layer.

FIG. 5 shows another example GUI screen 500 that includes a lighting heat map layer 510. Lighting heat map layer 510 can include colored or shaded regions indicating light coverage and brightness throughout the geographic area. For example, high-level region 520 represents areas with light brightness over a first threshold, mid-level region 530 can represent areas with light brightness below the first threshold and above a lower second threshold, and low-level region 540 can represent areas with light brightness below the second threshold. The regions can help a user visualize areas of the geographic area that may need additional lighting. In one example, heat map layer 510 corresponds to current lighting in the geographic area. In another example, GUI screen 500 also includes a heat map layer 510 that corresponds to lighting in a lighting plan.

Figure 6:
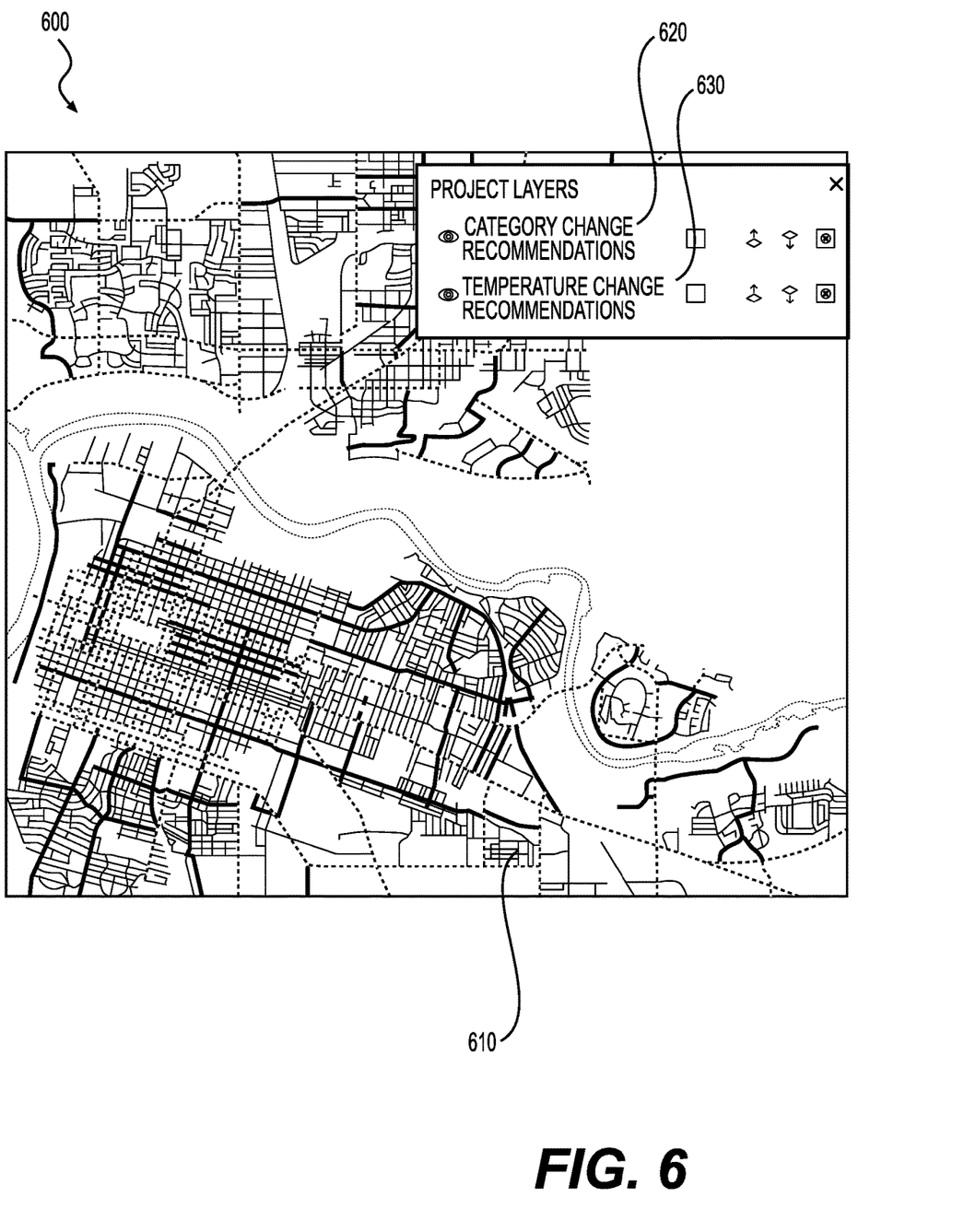
FIG. 6 is an illustration of an example GUI with lighting recommendation layers.

FIG. 6 shows another example GUI screen 600 that includes change recommendation layers. A change recommendation layer can illustrate areas of a geographic area where lighting changes are recommended. Change recommendation layers can also indicate the type of change recommended. In an example, streets in the geographic area are represented by lightly shaded lines 610. GUI screen 600 includes category change recommendation layer 620, which is represented by a dotted line. Streets that include dotted lines can indicate a recommendation to change the type of lighting currently being used. GUI screen 600 also includes temperature change layer 620, which is represented by a solid bold line. Streets that include solid bold lines can indicate a recommendation to change the temperature of lighting currently being used. A map with change recommendations overlaying the map area can help a user visual the areas where changes are recommended.

Figure 7:
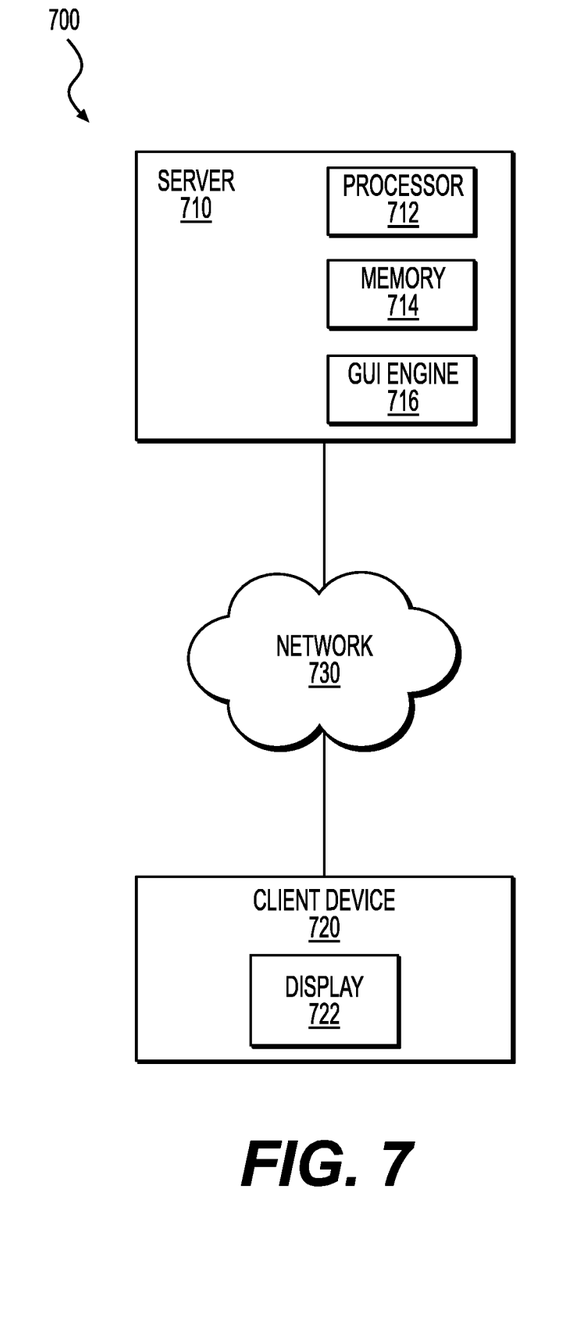
FIG. 7 is an illustration of a system for superimposing layers in a GUI for a lighting plan.

FIG. 7 includes an illustration of a system 700 for generating a GUI as described herein. System 700 can include server 710 and client device 720. Server 710 can be one or more network servers that includes processor 712, memory 714, and GUI engine 714. Server 710 can communicate with client device 720 via a network 730. Network 730 can be a local area network, an enterprise network, or the Internet. Memory 714 can be an example of a non-transitory storage medium. GUI engine 714 can generate a GUI as previously described herein. Some example types of server 710 can be an application server, web server, and enterprise server.

Client device 720 can be one or more processor-based devices, such as a personal computer, laptop, tablet, or cell phone, that includes a display 722 in which a user can interact with an interface. Client device 720 can receive the information necessary to display and run a GUI dashboard from server 710. In one example, client device 720 can include a client version of GUI engine 714, such as a graphics engine, that causes the GUI to be displayed on display 722 and relays selection input back to GUI engine 714. In another example, GUI engine 714 can create a GUI as a web app that can be accessed via a web browser. In this example, client device 720 would not need any local GUI software or engine to produce the GUI.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for light placement in a graphical user interface ("GUI"), comprising: receiving selection of rules that govern light properties for different area types; generating a plurality of layers on the GUI, the plurality of layers comprising: a map layer comprising a map of a geographic area, an object layer comprising three-dimensional ("3D") renderings of objects in the geographic area, and a lighting plan layer, wherein generating the lighting plan layer provides lighting objects having locations and properties based on the object layer and the selected rules; providing an option in the GUI to superimpose the lighting plan layer on the map layer; and superimposing the lighting plan layer on the map layer; wherein the plurality of layers further comprises: a current lighting layer, wherein the current lighting layers comprises current locations and properties of lighting in the geographic area, and wherein the current lighting locations and properties are detected using a sensor that is mounted to a vehicle and stored in a database for use in the current lighting layer; further comprising dividing the GUI into first and second regions separated by a divider, wherein the first region displays the current lighting layer and the second region displays the lighting plan layer, and wherein the option includes a slider that moves the divider and changes the relative sizes of the first and second regions.

2. The method of claim 1, wherein the plurality of layers further comprises an information layer, wherein the information layer comprises geographic information related to the geographic area.

3. The method of claim 1, wherein the selected rules include:
   a first rule that defines a first lighting temperature for a first area type related to crime rate; and
   a second rule that defines a second lighting temperature for a second area type, and
   wherein the first and second lighting temperatures are represented in the lighting plan layer.

4. The method of claim 3, wherein generating the lighting plan layer comprises:
   determining that one of the first area type and one of the second area type overlap in the geographic area;
   determining that the area type overlap creates a conflict in the selected rules;
   providing options in the GUI for resolving the conflict;
   receiving a selection of an option for resolving the conflict; and
   resolving the conflict based on the selected option.

5. The method of claim 1, wherein the lighting plan layer comprises a plurality of uniquely shaded regions corresponding to different levels of light brightness in geographic area.

6. A system for light placement in a GUI, comprising: a hardware-based processor communicatively connected to a computing device; and a non-transitory, computer-readable medium comprising instructions that, when executed by the processor, cause the processor to effectuate operations comprising: receiving selection of rules that govern light properties for different area types; generating a plurality of layers on the GUI, the plurality of layers comprising: a map layer comprising a map of a geographic area, an object layer comprising three-dimensional ("3D") renderings of objects in the geographic area, and a lighting plan layer, wherein generating the lighting plan layer provides lighting objects having locations and properties based on the object layer and the selected rules; providing an option in the GUI to superimpose the lighting plan layer on the map layer; and superimposing the lighting plan layer on the map layer; wherein the plurality of layers further comprises: a current lighting layer, wherein the current lighting layers comprises current locations and properties of lighting in the geographic area, and wherein the current lighting locations and properties are detected using a sensor that is mounted to a vehicle and stored in a database for use in the current lighting layer; wherein the instructions further comprise dividing the GUI into first and second regions separated by a divider, wherein the first region displays the current lighting layer and the second region displays the lighting plan layer, and wherein, the option includes a slider that moves the divider and changes the relative sizes of the first and second regions.

7. The system of claim 6, the plurality of layers further comprises an information layer, wherein the information layer comprises geographic information related to the geographic area.

8. The system of claim 6, wherein the selected rules include:
   a first rule that defines a first lighting temperature for a first area type related to crime rate; and
   a second rule that defines a second lighting temperature for a second area type, and
   wherein the first and second lighting temperatures are represented in the lighting plan layer.

9. The system of claim 8, wherein generating the lighting plan layer comprises:
   determining that one of the first area type and one of the second area type overlap in the geographic area;
   determining that the area type overlap creates a conflict in the selected rules;
   providing options in the GUI for resolving the conflict;
   receiving a selection of an option for resolving the conflict; and
   resolving the conflict based on the selected option.

10. The system of claim 6, wherein the lighting plan layer comprises a plurality of uniquely shaded regions corresponding to different levels of light brightness in geographic area.

11. A non-transitory storage medium containing instructions that when executed by a processor cause the processor to perform stages comprising: receiving selection of rules that govern light properties for different area types; generating a plurality of layers on the GUI, the plurality of layers comprising: a map layer comprising a map of a geographic area, an object layer comprising three-dimensional ("3D") renderings of objects in the geographic area, and a lighting plan layer, wherein generating the lighting plan layer provides lighting objects having locations and properties based on the object layer and the selected rules; providing an option in the GUI to superimpose the lighting plan layer on the map layer; and superimposing the lighting plan layer on the map layer; wherein the plurality of layers further comprises a current lighting layer, wherein the current lighting layers comprises current locations and properties of lighting in the geographic area, and wherein the current lighting locations and properties are detected using a sensor that is mounted to a vehicle and stored in a database for use in the current lighting layer; the stages further comprising dividing the GUI into first and second regions separated by a divider, wherein the first region displays the current lighting layer and the second region displays the lighting plan layer, and wherein, the option includes a slider that moves the divider and changes the relative sizes of the first and second regions.

12. The non-transitory storage medium of claim 11, wherein the plurality of layers further comprises an information layer, wherein the information layer comprises geographic information related to the geographic area.

13. The non-transitory storage medium of claim 11, wherein the selected rules include:
   a first rule that defines a first lighting temperature for a first area type related to crime rate; and
   a second rule that defines a second lighting temperature for a second area type, and
   wherein the first and second lighting temperatures are represented in the lighting plan layer.

14. The non-transitory storage medium of claim 13, wherein generating the lighting plan layer comprises:
   determining that one of the first area type and one of the second area type overlap in the geographic area;
   determining that the area type overlap creates a conflict in the selected rules;
   providing options in the GUI for resolving the conflict;
   receiving a selection of an option for resolving the conflict; and
   resolving the conflict based on the selected option.

* * * * *